Feb. 3, 1925.
H. A. SUTFIN
1,525,335
DISK HARROW
Filed July 26, 1923   2 Sheets-Sheet 2
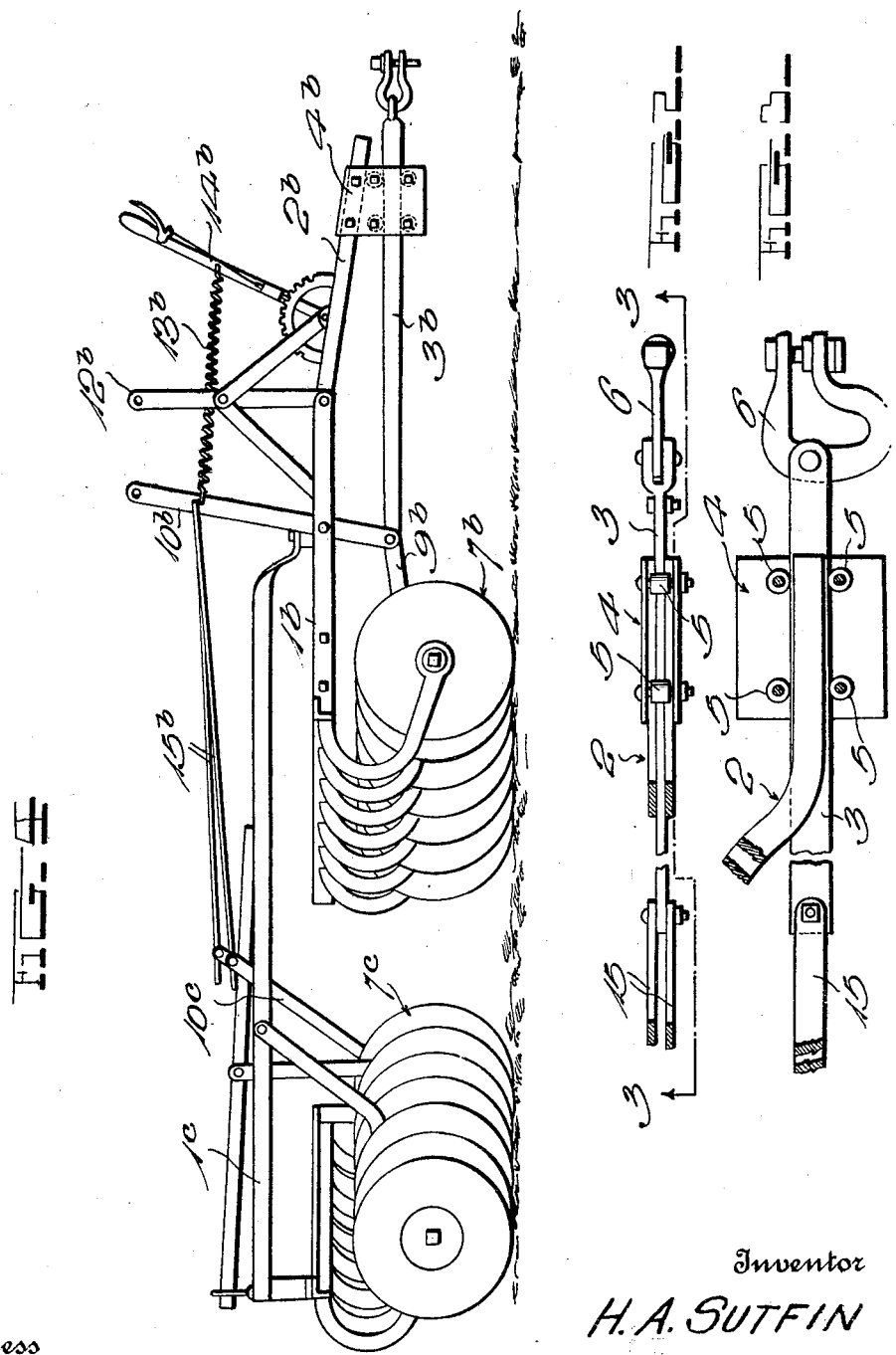
Inventor
H. A. SUTFIN
Witness
H. Woodard
By H. B. Wilson &Co
Attorneys Patented Feb. 3, 1925.

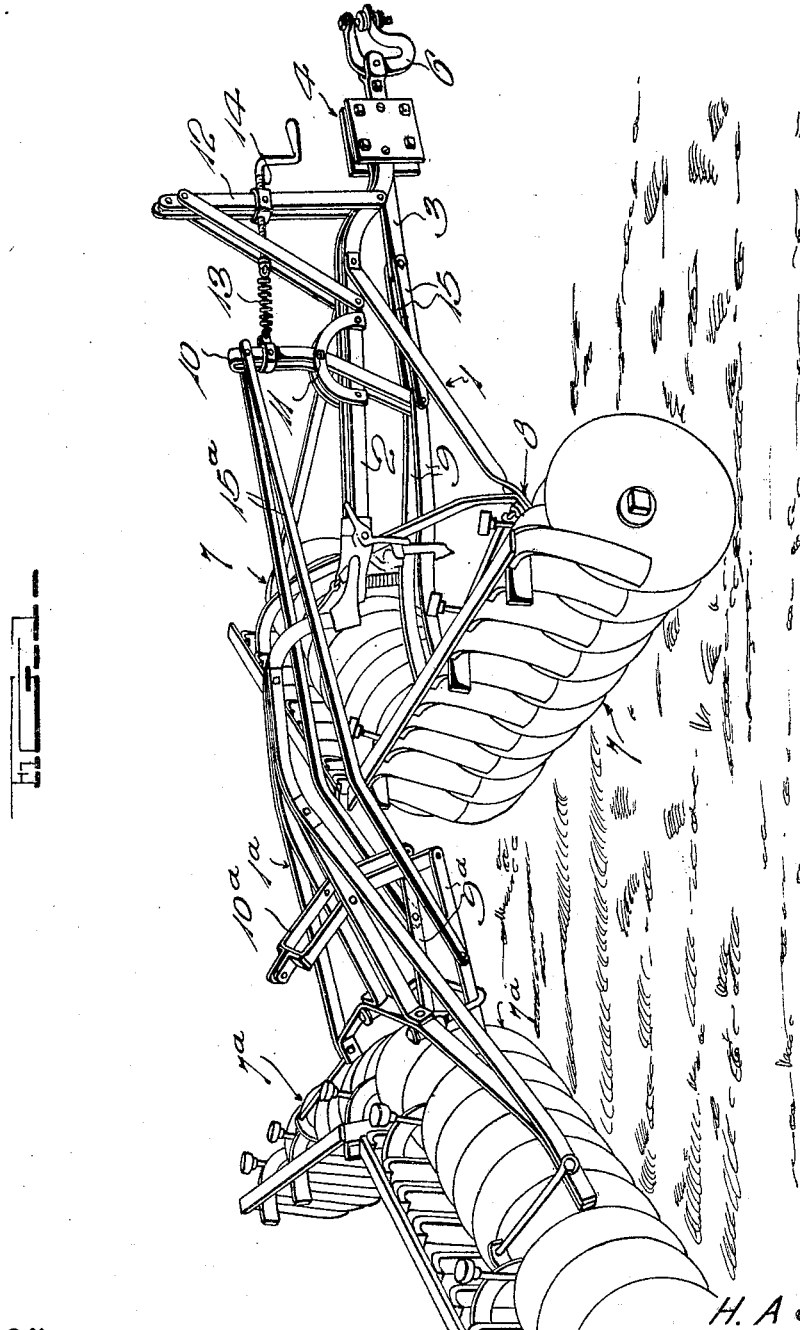

1,525,335

UNITED STATES PATENT OFFICE.

HAROLD A. SUTFIN, OF MARYSVILLE, CALIFORNIA.

DISK HARROW.

Application filed July 26, 1923. Serial No. 653,943.

*To all whom it may concern:*

Be it known that I, HAROLD A. SUTFIN, a citizen of the United States, residing at Marysville, in the county of Yuba and State of California, have invented certain new and useful Improvements in Disk Harrows; and I do declare the following to be a full, clear, and exact description of the invention, such as will enable others skilled in the art to which it appertains to make and use the same.

My invention relates to improvements in disk harrows in which the gangs of disks are normally located at an acute angle to the line of travel. It is practically impossible however, to pull harrows of this type when spots of wet soggy ground are encountered and it has therefore been customary, heretofore, to manually adjust the gangs of disks so as to move them into less acute angular relation with the line of travel. It is the object of my invention however to provide means for automatically effecting this adjustment wherever needed and a great deal of difficulty heretofore encountered is thus overcome.

With the foregoing in view, the invention resides in the novel subject matter hereinafter described and claimed, the description being supplemented by the accompanying drawings.

Figure 1 is a perspective view of a tandem disk harrow equipped with my improvements.

Figure 2 is a detail plan view, partly in horizontal section, showing the manner of slidably mounting the draw-bar.

Figure 3 is a sectional view as indicated by line 3—3 of Fig. 2.

Figure 4 is a side elevation of another form of harrow embodying my invention.

In the drawings above briefly described, (Figs. 1, 2 and 3), the numeral 1 designates a front substantially triangular frame including a central tongue 2 formed of a pair of horizontally spaced bars whose downturned front ends receive a draw-bar 3 therebetween. This draw-bar is usually adjustably bolted to the tongue 2, but in adapting my invention to the harrow, I provide a suitable guide 4 mounted on the front end of the tongue 2 and including rollers 5, this arrangement being employed for slidably mounting the draw-bar 3 for a purpose to appear. This draw-bar 3 may be provided with any desired form of hitch 6 for connecting it with a tractor or with suitable trees, if the harrow is to be drawn by a team or teams.

Two gangs of disks 7 have their outer ends loosely connected with the rear corners of the frame 1, as indicated at 8 and a pair of links 9 lead forwardly from the inner ends of said gangs to the lower end of a substantially upright lever 10 which is fulcrumed between its ends at 11 to a suitable part of the frame. An appropriately braced standard 12 is shown in front of the lever 10 and manually operated adjusting means usually connect said standard and lever. This adjusting means however is eliminated in constructing a machine in accordance with my invention, and I provide a spring connection 13 between the upper end of the lever 10 and said standard 12. An adjusting screw 14 is preferably mounted on the standard and engages with the spring 13, so that the tension of the latter may be adjusted as required. This spring normally exerts a tension to operate the parts 9 and 10 and moves the inner ends of the disk gangs 7 rearwardly, so that said gangs are at the required acute angles to the line of travel. When however the disks engage earth through which they can be pulled only with extreme difficulty, the draw-bar 3 which is connected by links or the like 15, with the lower end of the lever 10, pulls forwardly to such an extent as to overcome the action of the spring 13, thus effecting movement of the lever 10 and links 9 to decrease the acute angular relation existing between the gangs 7 and the line of travel. Thus, the edges of the disks are turned directly toward the front of the machine and the latter can be easily pulled until the spot of ground which has caused the difficulty, is passed over. When this takes place, the spring 13 again returns the disk gangs to their proper operating positions.

The construction so far described would constitute a complete two-gang disk harrow. The harrow shown however is of the tandem type, in which a rear frame 1ª is suitably connected with the front frame 1 and carries two rear gangs of disks 7ª. Mounted upon the frame 1ª, I have shown a lever 10ª whose lower end is connected by links 9ª with the inner ends of the gangs 7ª to effect angular adjustment thereof. The upper end of this lever is ordinarily connected with adjusting means on the standard 12, but this adjusting means is not necessary when constructing the machine in accordance with my invention. To carry out the desired adjustment of the gangs $7^a$ however, I connect either the links $9^a$ or the lower end of the lever $10^a$ with the upper end of the lever 10, by means of a pair of bars or links $15^a$. By this arrangement, it will be seen that adjustment of the rear gangs will be effected simultaneously with the above described adjustment of the front gangs.

Figure 4 illustrates another form of disk harrow, reconstructed to some extent in accordance with my invention. Front and rear frames $1^b$ and $1^c$ are shown suitably connected with each other and provided with front and rear gangs $7^b$ and $7^c$ respectively. The front frame $1^b$ is provided with a tongue $2^b$ having a suitable guide $4^b$ for a longitudinal slidable draw-bar $3^b$. A lever $10^b$ is fulcrumed on the frame $1^b$ and is connected at its lower end with the inner ends of the gangs $7^b$ by suitable links $9^b$, the draw-bar $3^b$ being also connected to the lower end of said lever. Rods or the like $15^b$ extend rearwardly from the upper end of the lever $10^b$ to adjusting arms $10^c$ for the gangs $7^c$.

At $12^b$, the old standard is shown which usually carries adjusting means for the lever $10^b$. This means has been omitted however and a spring $13^b$ has been connected with the lever $10^b$, while the other end of said spring is connected to an adjusting lever $14^b$.

The operation of the construction just described will be clear without further explanation as it is substantially the same as that previously described.

Excellent results are obtainable from the general constructions shown and described, and they are therefore preferably followed, but it is to be understood that my improvements may be applied to numerous forms of disk harrows, and that within the scope of the invention as claimed, numerous changes may be made.

I claim:

1. A disk harrow comprising a frame, gangs of disks connected with said frame and normally disposed at acute angles to the line of travel, a movable yieldably resisted hitch for said frame, and means actuated by forward movement of said hitch with respect to the frame for moving said gangs into a less acute angular relation with the line of travel.

2. A disk harrow comprising a frame, gangs of disks connected with said frame, resilient means for normally holding said gangs at acute angles to the line of travel, and a hitch movable with respect to the frame and operatively associated with said gangs for overcoming the action of said resilient means under a pull exceeding a predetermined strength.

3. A disk harrow comprising a frame, gangs of disks connected with said frame, a substantially upright lever fulcrumed on the front end of the frame and connected with said gangs for swinging them to different angles with respect to the line of travel of the machine, a spring device acting on said lever to normally dispose said gangs at acute angles to the line of draft, and a forwardly and rearwardly movable draw-bar mounted on the front end of said frame and connected to said lever for moving the latter against the action of said spring device under the influence of a forward pull exceeding a predetermined strength.

4. A disk harrow comprising a frame, gangs of disks connected with said frame, a substantially upright lever fulcrumed on the front end of the frame, and connected with said gangs for swinging them to different angles with respect to the line of travel of the machine, a spring device acting on said lever to normally dispose said gangs at acute angles to the line of draft, an adjusting device at the front end of the frame for anchoring said spring device and varying the strength thereof, and a forwardly and rearwardly movable draw-bar mounted on the front end of said frame and connected to said lever for moving the latter against the action of said spring device under the influence of a forward pull exceeding a predetermined strength.

5. In a disk harrow having a hitch, and gangs of disks at an acute angle to the line of draft, means actuated by the forward pull on said hitch and controlled by the resistance encountered by said disks for automatically changing the acute angular relation of said gangs with respect to the line of travel proportionately with variance of resistance against the disks.

In testimony whereof I have hereunto affixed my signature.

HAROLD A. SUTFIN